US009679428B2

(12) United States Patent
Arpin et al.

(10) Patent No.: US 9,679,428 B2
(45) Date of Patent: Jun. 13, 2017

(54) METHOD OF CONTROL OF PERSONS AND APPLICATION TO THE INSPECTION OF PERSONS

(71) Applicant: MORPHO, Issy Les Moulineaux (FR)

(72) Inventors: Didier Arpin, Issy les Moulineaux (FR); Christine Riveau, Issy les Moulineaux (FR); Antoine Clouet, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days.

(21) Appl. No.: 14/897,628

(22) PCT Filed: Jun. 12, 2014

(86) PCT No.: PCT/EP2014/062197
§ 371 (c)(1),
(2) Date: Dec. 10, 2015

(87) PCT Pub. No.: WO2014/198812
PCT Pub. Date: Dec. 18, 2014

(65) Prior Publication Data
US 2016/0117876 A1 Apr. 28, 2016

(30) Foreign Application Priority Data

Jun. 14, 2013 (FR) .................................. 13 55607

(51) Int. Cl.
G05B 19/00 (2006.01)
G07C 9/00 (2006.01)
H04L 9/32 (2006.01)

(52) U.S. Cl.
CPC ..... *G07C 9/00158* (2013.01); *G07C 9/00087* (2013.01); *G07C 9/00103* (2013.01);
(Continued)

(58) Field of Classification Search
CPC ............ G07C 9/00158; G07C 9/00103; G07C 9/00166; G07C 9/00087; G07C 2209/12;
(Continued)

(56) References Cited

U.S. PATENT DOCUMENTS

2003/0058084 A1* 3/2003 O'Hara ................. G07B 15/00
340/5.53
2004/0169076 A1 9/2004 Beale et al.
(Continued)

FOREIGN PATENT DOCUMENTS

WO WO-2004006076 1/2004
WO WO-2005054981 6/2006

OTHER PUBLICATIONS

French Search Report and Written Opinion, dated Mar. 20, 2014, French Application No. 1355607.
(Continued)

*Primary Examiner* — Dhaval Patel
(74) *Attorney, Agent, or Firm* — Blakely Sokoloff Taylor & Zafman LLP (57) ABSTRACT

The invention relates to a method of control of persons, in which various control/inspection steps are implemented at various control points intended to be crossed by a person, characterized by the implementation of the following operations: —when a person passes a first point: •acquisition of biometric data of the person, •generation of a secure identity token, on the basis of biometric and/or identification data of the person, the token being an encrypted biometric signature obtained on the basis of a biometric datum acquired on the person, •generation of a public identifier associated with said token and storage of said identifier in a data base in association with the identity tokens or the data on the basis of which they are generated, —when a person passes at least one other control point, •acquisition of an identity datum and/or of a biometric datum about the same biometric trait
(Continued)

or traits of those about which the biometric datum was acquired on passing the first control point, and on the basis of which the identity token (J) was generated, •determination of the public identifier of the person, by implementing an authentication of said person on the basis of the datum or data acquired and of the data stored in the database. The invention also relates to a system for controlling and for inspection of persons for the implementation of the method.

14 Claims, 7 Drawing Sheets

(52) U.S. Cl.
CPC ........ *G07C 9/00166* (2013.01); *H04L 9/3231* (2013.01); *H04L 9/3234* (2013.01); *G07C 2209/02* (2013.01); *G07C 2209/12* (2013.01)

(58) Field of Classification Search
CPC .. G07C 2209/02; H04L 9/3234; H04L 9/3231
USPC ........ 340/5.52, 542, 5.51, 5.61, 5.83, 572.3, 340/5.53, 10.52; 382/115, 116, 124
See application file for complete search history.

(56) References Cited

U.S. PATENT DOCUMENTS

| | | |
|---|---|---|
| 2006/0126906 A1 | 6/2006 | Sato et al. |
| 2006/0197836 A1 | 9/2006 | Orias |
| 2008/0289020 A1* | 11/2008 | Cameron ............ H04L 63/0861 726/9 |
| 2008/0302870 A1 | 12/2008 | Berini et al. |
| 2010/0289614 A1 | 11/2010 | Rechner et al. |

OTHER PUBLICATIONS

International Search Report with English Language Translation and Written Opinion, dated Nov. 6, 2014, Application No. PCT/EP2014/062197.

* cited by examiner

METHOD OF CONTROL OF PERSONS AND APPLICATION TO THE INSPECTION OF PERSONS

FIELD OF THE INVENTION

The present invention relates to the field of control processes of persons, and control and inspection systems of persons in inspection zones.

The invention applies especially to systems installed in sensitive places for the public, and in which it is necessary to undertake checking and tracking of individuals. The invention applies for example to places such as airports, comprising control systems for inspecting and filtering persons preparing to board an airplane (or a ship, etc.).

PRIOR ART

Infrastructures for controlling and inspecting persons are generally installed in so-called sensitive places, and in particular in infrastructures of vital importance in terms of EU directive COM (2006) 766 and/or in terms of American Presidential directive PDD-63 of May 1998 ("Critical Infrastructure Protection") since the latter receive the public.

Sensitive places are for example high-security buildings (state or public buildings such as embassies, departments of defence, intelligence agencies, hospitals, . . . ), industrial or commercial buildings such as banks or nuclear plants, transport infrastructures (ports, airports, stations, . . . ) or even public infrastructures accommodating a large number of persons (e.g. stadiums, concert halls . . . ).

In such places, inspection and filtering techniques currently installed are sequential processes which comprise a certain number of control steps.

For example, in the case of airports, inspection of persons prior to boarding can comprise the following steps:
  Registration of an individual, during which his identity can be checked and his right to board can be verified via an identity document, and he/she is issued with a boarding pass symbolising this right to board.
  A security check, during which the boarding pass is checked and the individual and if needed his baggage is passed through different inspection systems to detect any threats or, in some cases, prohibited items. Variations in the inspection protocol conducted on the individual and his baggage can optionally be made if the individual represents a particular risk, or if the results of a first inspection indicate the probable existence of a threat or a prohibited item. This is the case for example when metal has been detected on an individual by a walk through detector and the individual must then undergo a verification search.
  A boarding check, where again the right of the individual to board is verified by checking the boarding pass, and if needed his identity.

This process is particularly long and tiresome for passengers, who must produce their identity document and/or their boarding pass at each step.

The sequential character, which is necessary since it implicitly informs a check post that the preceding posts have been passed successfully, generates long and uncomfortable wait times, making this way of moving impractical, and they do not allow persons presenting a low risk level to cross checkpoints quickly.

The fact of applying the same level of security to all persons crossing checkpoints can also involve lowering this level of security to avoid excessively long waiting lines, at the risk of failing to intercept a suspect individual.

Also, the different control steps are taken disjointedly by different operators and this does not allow collecting security information on the persons, comprising for example a risk associated with a person, or summarising the different inspection steps performed on this person and the results of said inspections. This therefore reduces system security.

Manual verification of identity documents or access cards also makes for limited security as it is sometimes difficult for an operator to distinguish a false document.

Finally, current systems make it impossible to locate the individual between two control steps.

The same problems occur in general in other secure premises in which the inspection and control processes conventionally comprise several sequential steps for verification of identity and/or right of access, security inspections, etc., causing considerable wait queues for different inspection steps which are not linked to each other.

There is therefore a need to propose a system for integrated and automated control of individuals which is more effective than current systems, which reduces wait times for passing through all the control steps and allow securer checking of individuals presenting a particular risk.

There is also a need for a system which determines the position of the checked individuals.

Some systems have been proposed which partially resolve this problem. So for example, it has been proposed to deliver to an individual a smart card containing identity information linked to this individual, and to use this smart card for checking the individual during subsequent steps, and for locating him in the zone the individual is passing through.

Document U.S. 2008/302870 is known for example which proposes supplying a person with a boarding pass comprising a biometric datum of the person, for then authenticating the person by authentication between the datum of his boarding pass and a datum newly acquired on the person.

Document U.S. 2010/0289614 is also known, which proposes anticipating the registration of some information for accelerating control once in the inspection zone to be crossed prior to accelerating to the zone of secure access.

However this type of proposition does not eliminate the sequential character of checks, and always obliges the individual to present a document (in this case the smart card), at each control. Also, exchange of the document is possible between two individuals, creating the risk of letting a threat through.

PRESENTATION OF THE INVENTION

The aim of the invention is to eliminate the problem mentioned hereinabove by proposing a control process of a person which dispenses with providing documents to the person for passing through controls.

Another aim of the invention is to propose a control process of a person for knowing the control steps he has passed through and locating him, but preserving his anonymity, the process following the principles prescribed by the concept of "Privacy by Design".

The aim of the invention finally is to propose a process comprising inspection steps of a person, which are non-sequential and eliminate untimely wait queues.

In this respect, the aim of the invention is a control process of persons in which different control and/or inspection steps are performed at different control and/or inspection points intended to be passed by a person, characterized by carrying out the following operations:

when a person passes a first control and/or inspection point:
  generation of a secure identity token, from biometric and/or identification data of the person,
  association of a public identifier with said token and storage in a database saving the public identifiers by association with the identity tokens or the data from which they are generated,
when a person passes at least one other control and/or inspection point,
  acquisition of an identity datum and/or a biometric datum,
  determination of the public identifier of the person by conducting authentication of said person from the datum or data acquired and the data stored in the database.

Advantageously, but optionally, the process according to the invention can further comprise at least one of the following characteristics:

when a person passes the first control and/or inspection point, at least one biometric datum is acquired on at least one biometric trait of said person by a biometric sensor of this control and/or inspection point, the secure identity token being obtained from the biometric datum acquired, and at least one biometric datum acquired on the same biometric trait(s) is acquired at the other control points.

the identity token is an encrypted biometric signature obtained from the biometric datum acquired on the person.

the biometric data are acquired on the fly from contactless biometric sensors.

The process comprises, at least at one control and/or inspection point,
  association with the public identifier of a person of security information relevant to said person and/or the control and/or inspection processing carried out at the level of said point
  saving this information with said public identifier in the database.

The process further comprises when the latter passes at least one control and/or inspection point:
  determination of security information connected to the public identifier of a person,
  adaptation of the control and/or inspection processing to said control point as a function of this information.

the security information connected to the public identifier of a person comprise a risk profile of the person, and an inspection protocol determined as a function of a risk profile is undertaken on the person at each control and/or inspection point.

the inspection protocol comprises instructions for passing through determined control and/or inspection points and levels of inspection sensitivity to be implemented at one or more control and/or inspection points.

The process further comprises, when a person passes a control and/or inspection point, once said person has crossed one or more determined control and/or inspection points, deletion of the identity token or biometric or identification information of the person in the database.

After deletion of the identity token or biometric or identification information of a person in the database, the associated public identifier and security information relevant to the person and/or the control and/or inspection processing carried out on said person are stored in the base.

The process further comprises, when a person passes at least one control and/or inspection point:
  the acquisition of information relative to numbers of persons arriving at control and/or inspection points; and
  the directing of persons to a following control and/or inspection point as a function of said information.

When a person passes a control and/or inspection point, the process comprises verification of crossing rights of the person of said control and/or inspection point.

at least one control and/or inspection point is applied to baggage associated with a person, the process comprising, when passing said control and/or inspection point applied to baggage, association with the public identifier of the person information relevant to the control and/or inspection processing executed on the baggage.

When a person crosses a control and/or inspection point, the process comprises acquisition of images of said person, and, when the person moves between two control and/or inspection points, the tracking of said person by acquisition of images of said person.

The invention also proposes application of the process previously described for the control and the inspection of passengers and aircrew in an airport.

The invention also proposes a system for control and inspection of persons in an inspection zone, the system comprising a plurality of control and/or inspection points, the system further comprising at least one processing unit comprising means for implementing the process described previously.

Advantageously, but optionally, the system for inspection control of persons comprises at each control and/or inspection point a module comprising a processing unit and a biometric sensor, and further comprising at least one inspection unit connected to said module, the inspection unit being adapted to communicate with the processing unit to adapt inspection processing of a person as a function of information supplied by the processing unit.

The control process according to the invention tracks the progression of a person in a zone from his biometric traits, without as such identifying him formally; in fact, by way of the encrypted biometric signature and the associated public identifier, it suffices to associate with the person this identifier to ensure tracking him without the need to know his veritable identity.

Various information can be connected to this identifier to form a profile, if needed adapting the level of control carried out on the person.

Also, the possibility of deleting from the database the encrypted biometric signatures of the persons who have passed through the controls limits the quantity of signatures stored in this base and therefore limits the "false positives", that is, erroneous identifications of persons.

Finally, the aggregation of security information relative to the person and the control and inspection steps in a centralised database installs inspection posts associated with the tracking modules in network without sequential character, reducing or even eliminating the wait lines at inspection stations.

DESCRIPTION OF FIGURES

Other characteristics, aims and advantages of the present invention will emerge from the following detailed description by way of the appended figures given by way of non-limiting examples, and in which.

DETAILED DESCRIPTION OF AT LEAST ONE EMBODIMENT OF THE INVENTION

System for Control and Inspection of Persons

Figure 1A:
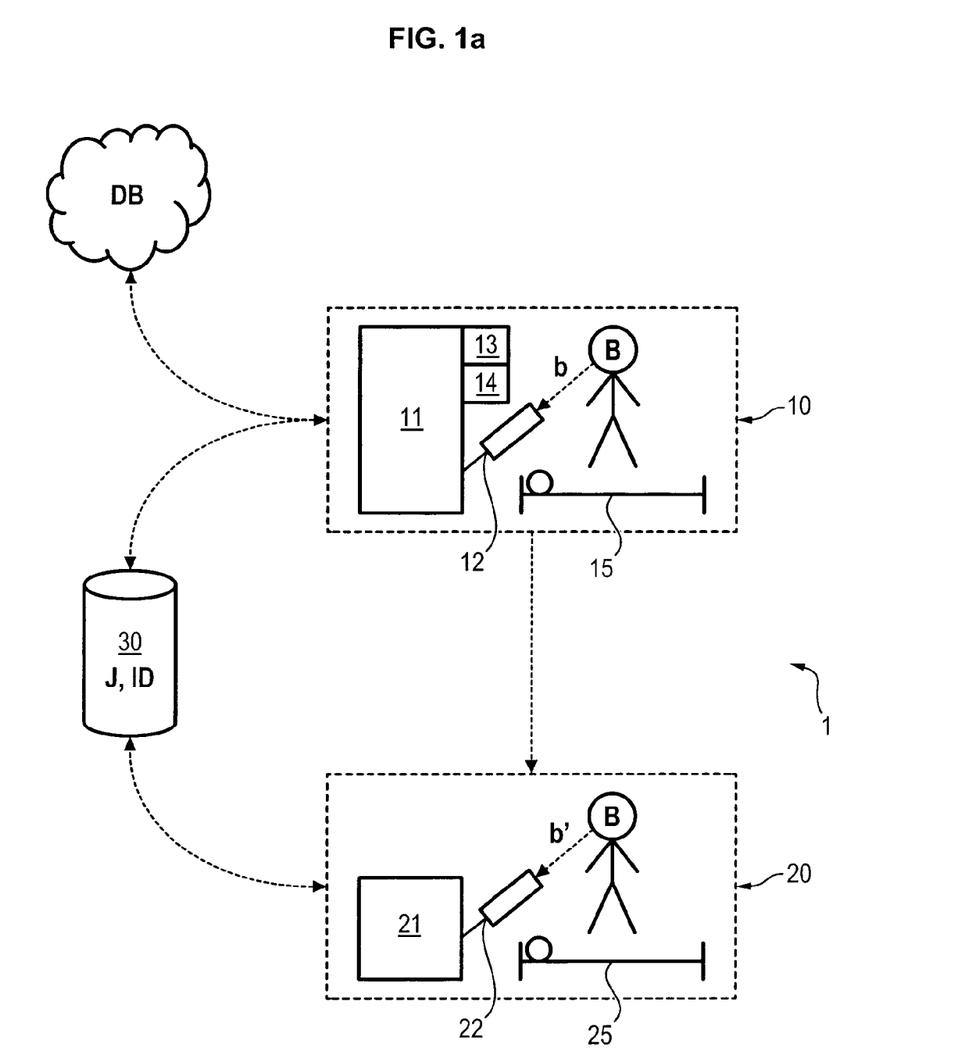
FIGS. 1a and 1b schematically illustrate a system for control and inspection of a person according to two separate embodiments.
Figure 1B:
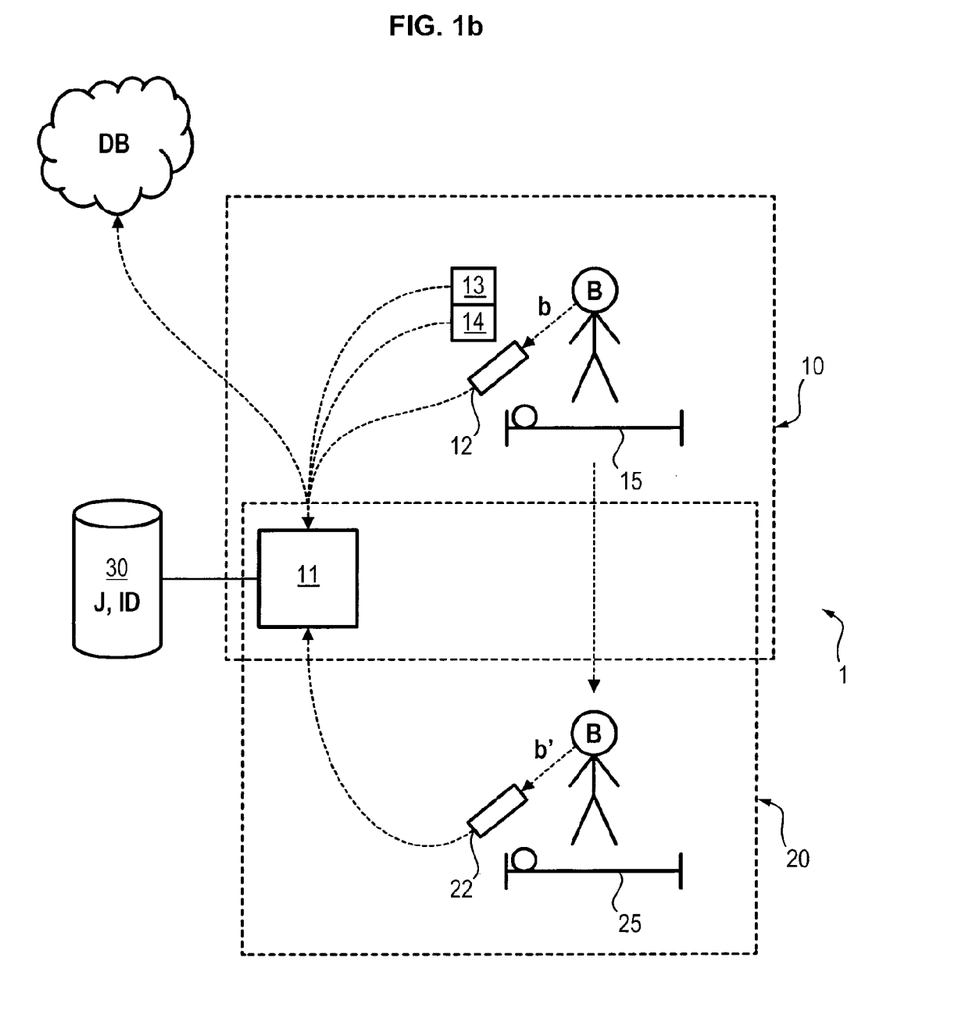

In reference to FIGS. 1a and 1b, these schematically illustrate a system 1 for control and tracking of a person.

This system 1 is advantageously placed at the entry to a secure access zone of a sensitive place accommodating persons, such as for example the boarding zone in an airport, an embassy, a museum, etc.

The following will be used to illustrate the example of an access zone to a boarding zone of an airport in which only those persons registered for a flight as well as some members of the personnel are authorised to be in, even though this example is not limiting and the tracking and control system applies to any sensitive place.

The system 1 advantageously delimits an inspection zone a person must pass through before being authorised to enter the secure access zone. In the inspection zone is a plurality of control and/or inspection points of persons.

Each control and/or inspection point is embodied by a control and/or inspection module of a person. Such a module advantageously comprises a biometric data sensor, adapted to acquire a biometric datum on a biometric trait of a person, and a processing unit adapted to communicate with said sensor to receive the biometric datum and process it. The module can alternatively comprise several different sensors, these sensors optionally being biometric data sensors of different kinds (for example: face and iris).

Hereinbelow, control and/or inspection modules are distinguished in two categories: the control module 10, which is the first module passed through by a person, and by which a person is recorded in the system 1, and the tracking module(s) 20, which are the following modules the person must pass through before leaving the inspection zone. Each of the control module 10 and of the tracking module(s) 20 can further be associated with an inspection unit 50 for conducting inspection of the person and/or his baggage, as will be described hereinbelow.

Advantageously, but non-limiting, the tracking modules 20 and the control module 10 are not connected by any material link. They are capable of communicating only with at least one database 30 of the system managing information relative to the persons passing the different control points, this information comprising as described hereinbelow identification data of the persons and/or security data relative to the persons and controls they have undergone.

FIGS. 1a and 1b illustrate a system 1 comprising a control module 10 of persons, and a tracking module 20.

The control module 10 controls the authorisation of persons to enter the zone. In the event where the system is placed at the entry to a boarding zone in an airport, the control module 10 is advantageously adapted to control the right of a person to board an airplane, for example by controlling a boarding pass and/or an identity document and/or his authorisation to enter the zone, and if needed to control the identity of the person.

The control module 10 comprises a processing unit 11 and advantageously a biometric trait sensor 12. Alternatively, the sensor 12 can be adapted to acquire, in place of or in addition to biometric data, identification information on the individual such as for example his signature, information relative to his clothes, etc.

The tracking module 20 further comprises a processing unit 21 and advantageously a biometric trait sensor 22 and/or if needed other identification information.

According to a first embodiment, as illustrated in FIG. 1a, each tracking module 20 can comprise a processing unit 21 in its own right. Alternatively, as illustrated in FIG. 1b, a single processing unit 11 can be shared between the control module and one or more tracking modules. In this case, the biometric trait sensors of the modules are adapted to communicate with the processing unit.

The biometric trait sensors are devices for acquiring a biometric datum, that is, digital encoding of a biometric trait of a person.

Advantageously, the biometric trait sensors 12, 22 of the control unit and of the tracking unit are adapted to each acquire one or more biometric data respectively from biometric traits of the same type; that is, for example an image of the face, of the iris, digital fingerprint capture, palms, venous networks, etc.

Identification data of the person can also be acquired which are not necessarily qualified as biometric (e.g. particular traits captured by video such as the colour of clothes, size, skin colour . . . ).

The sensors 12, 22 are advantageously adapted to acquire biometric traits on the fly, without interrupting the progression of the person. This is the case for example if the sensors 12, 22 comprise cameras for acquisition on the fly an image of a face or iris of the person. If needed, this also acquires a biometric datum of the person without the active participation of the latter.

Sensors 12, 22 of the MORPHO 3D FACE READER™ or MORPHOFACE™ investigate type could be used for example.

Alternatively the sensors 12, 22 can also be of digital fingerprint sensor type, or venous networks. sensors such as MORPHOSMART™ FINGER VP DESKTOP SERIES, MORPHOSMART™ OPTIC 300 or 1300 SERIES, MORPHOTOP™, etc. could especially be used.

The processing units 11, 21 of the control module and of the tracking module are processors adapted to communicate respectively with the sensors 12 and 22, and for executing the instructions or protocols described hereinbelow.

The system 1 further comprises a database 30 connected to the processing units 11, 21, so that said units can access the database for reading and writing.

According to the embodiment of FIG. 1a, the database 30 is separate from the processing units 11, 21. However, as in FIG. 1b, a common processing unit 11 and the database 30 can be installed on a single server, for example a remote server. In conventional terms the database 30 can also be linked to a processor (not shown) for managing data from the database.

The functionalities of the control and tracking modules of a person will now be described in more detail.

As indicated previously, the sensor 12 of the control module is adapted to acquire at least one identification datum and/or at least one biometric datum b from at least one biometric trait B of a person, and for communicating it to the processing unit.

The latter comprises instruction code for generating, from data communicated by the sensor 12, unique identification means of a person in the form of a secure identity token J. This token can be prepared from one or more biometric data and/or one or more identity data.

In a particular embodiment, the identity token of the person is an encrypted biometric signature obtained by encrypting the biometric datum. The encrypting protocol can be carried out by a one-way function, preventing retrieval of the biometric information of the person from the signature. An encrypting protocol as described in document WO 2009/083518 or in document FR1354006 for example could be selected.

This identity token is secret. It can be recorded in the database 30 by processing unit 11. Alternatively, the identification information and/or the biometric data used for its preparation are stored in the database.

The processing unit 11 further generates a public identifier Id associated with this identity token. This identifier is advantageously generated randomly and is unrelated to the identity of the person. It can for example be an alphanumeric code generated randomly, distinct from the name, the first name, and identity document numbers of the person.

This public identifier is recorded in the database in association with the identity token, or in association with the data stored in the base and which have been used to generate the token. For example, if the database comprises a plurality of indexed memory blocks, a token and a public identifier of a person are also indexed and recorded in the memory block of the same index of the database.

The control module 10 further comprises a document-reading device 13 for controlling the right of the person to enter the secure zone. For example, the document can be a boarding pass fitted with a barcode or an alphanumeric code, comprising identification information of the passenger, his flight.

The reading device 13 is adapted to communicate the acquired information to the processing unit.

The processing unit can validate the right of the person to pass through the control module only when the information relative to his boarding pass or any other document has been acquired. In this case it can record in the database security information according to which it has been verified that the person has the right to pass through the module.

Advantageously, but optionally, the control module 10 can further comprise an acquisition device of identity data 14 from an identity document, the identity data for example being stored in the document in the form of barcodes, alphanumeric characters, smart cards, etc.

If needed, the devices 13 and 14 can be combined into a single reader adapted to read the identity documents and access cards of the person to the zone at the same time.

This device 14 acquires identity data of the person arriving at the control module and communicates said data to processing unit 11 so that the latter checks the identity of the person. For this it can, as is known, compare an identity photograph acquired on an identity document to a photograph of the person acquired by the sensor 12, or even confront the identity data in another database (not shown).

The processing unit 11 can validate the right of the person to pass through the control module only when his identity has been checked and his boarding pass has been validated. In this respect, the control module can comprise a gate 15 blocking or authorising passage of a person, the opening and closing of the gate being controlled by the processing unit 11.

The processing unit 11 can also record in the database security information according to which the identity of the person has been verified.

Furthermore, the processing unit can also be in communication with one or more databases DB external to the system 1, for example national or international, which store information on the persons.

Once the person is identified, the processing unit 11 can search in the database DB for information relative to this person, for example security information such as a relevant level of risk. Alternatively, the processing unit 11 can receive information from the database DB on the person and as a function of said information generate a relevant level of risk. This level of risk can be recorded by the processing unit 11 in the database 30 of the system.

Each tracking module 20 is downstream of the control module relative to the flow of persons.

The sensor 22 acquires one or more biometric data and/or one or more identification data of the person. Advantageously the sensor 22 captures the same data as the preceding sensor 12. In the case of biometric data, the sensor 22 therefore advantageously acquires a datum or several biometric data respectively from said or the same traits as the sensor 12 of the control module, that is, if the sensor of the control module acquires a face image, the sensor 22 also.

The sensor 22 is adapted to communicate with the processing unit 21, to send the datum or the data acquired to said unit.

The processing unit 21 is then adapted to perform, from said data, authentication of the person with one of the persons whereof the public identifiers are stored in the base, from comparison between the data acquired by the sensor 22 and the data stored in the base, comprising either the identity tokens or the biometric and/or identification data having generated the tokens.

So for example, if the identity tokens comprise a signature, digital fingerprint and clothing colour, the processing unit compares the corresponding data acquired by the sensor 22 to the different tokens stored to get correspondence with one of them.

According to a preferred embodiment the control system executes a minimally discriminating correspondence operation, known as "weak link", such as proposed in the Morpho U.S. Pat. No. 7,724,924 B2. This correspondence operation authenticates the person on the database acquired by the sensor 22 but without formally identifying the person.

According to the embodiment in which the identity token comprises an encrypted biometric signature, the processing unit 21 comprises code instructions for the execution of the same encryption protocol as that executed by the processing unit 11 of the control module. The processing unit 21 therefore generates an encrypted biometric datum from the biometric datum transmitted by the sensor 22.

Then the processing unit 21 accesses the database 30 by reading and compares the encrypted biometric datum to each of the encrypted biometric signatures stored in the database to detect correspondence.

This comparison is preferably performed by way of a secure calculation protocol which compares the biometric data to each other without needing to decrypt them. The absence of identification preserves the confidentiality of the person present at the tracking module as well as persons who previously presented at the control module and have their encrypted biometric signature recorded in the base.

When correspondence has been detected between the person and one of the persons recorded in the base by data processing, the unit 21 receives from the database 30 the public identifier associated with the person and identifies the person from whom has been obtained the biometric datum such as the person from whom the encrypted biometric signature associated with the identifier has been previously obtained.

This recognises the person without having access to his/her identity.

The tracking module 20 can also include a gate 25 authorising or blocking passage of a person, and the processing unit 21 of the module controls opening or closing of the gate. So once the person has been identified by his public identifier, the processing unit 21 can control the gate 25 to authorise passage of the person.

The processing unit 21 is also adapted to access the database 30 by writing, for example to associate with the public identifier of the person information according to which he has passed through the control module 20, once this person has been recognised.

Especially in the event where the system comprises several tracking modules, this ensures tracking of the person by steps. Of course, in this case the processing units 21 are also adapted to retrieve, at the time of recognising the person by comparison of acquired data to the data stored in the base, the information according to which the person has passed through one or more preceding control and/or tracking modules.

In this case also, the processing unit 21 of a tracking module can be configured to verify that a person has crossed all the prescribed tracking modules, and to delete the corresponding identification data and/or the biometric data and/or identity tokens once the person has passed through said modules.

For example, the system 1 can comprise three tracking modules associated with three separate areas to be crossed in the secure zone, and when a person crosses the third module the latter commands the database to delete the identity token of the person.

First, this retains the confidentiality of persons who have passed through the different tracking modules: the information linked to their biometry is omitted, and the public identifiers and the associated information on the level of risk and the modules passed through can be retained as examples for later security purposes.

Also, this keeps the number of persons recorded in the database at a slightly higher level, which significantly lowers the number of false authentications made by the processing unit 21 based on data acquired at the level of the tracking modules.

Also, this authentication operation is conducted on a limited number of tokens and authorises almost instantaneous recognition of the person presenting at the tracking module.

As explained hereinbelow in reference to FIG. 2a, it is advantageous to install this system to perform security inspections, for example for airports or other sensitive sites where control levels are substantial.

In this case, the system 1 further comprises at least one inspection unit 50.

Preferably, the system 1 comprises a plurality of tracking modules and a plurality of inspection units, each tracking module being associated with an inspection unit, and the identifier of a person by his public identifier at the level of the tracking module 20 conditioning his access to the inspection unit 50.

Figure 2A:
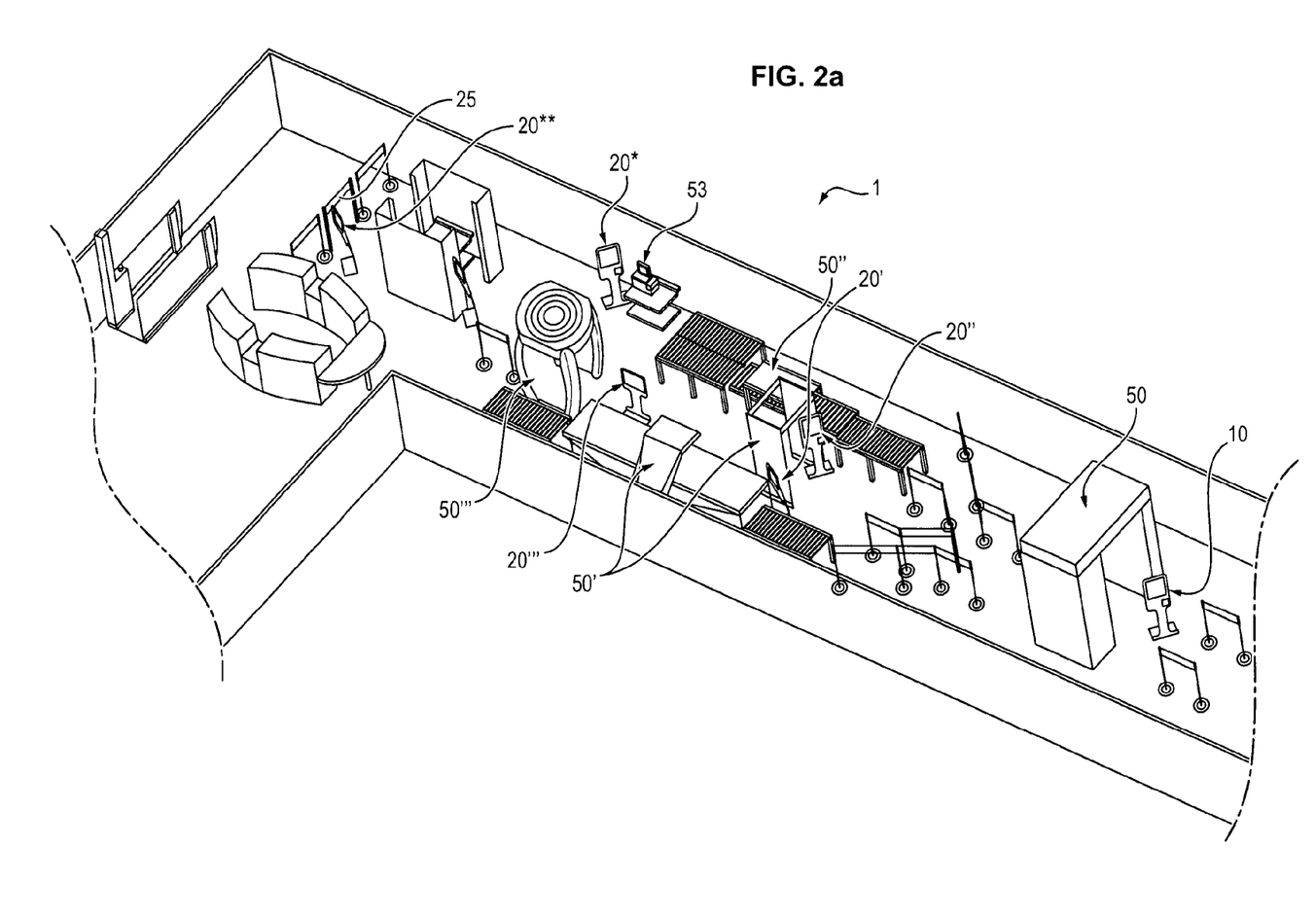
FIG. 2a illustrates a system for control and inspection of a person according to a particular embodiment, FIG. 2b schematically illustrates part of an inspection system comprising a tracking module associated with an inspection unit.
Figure 2B:
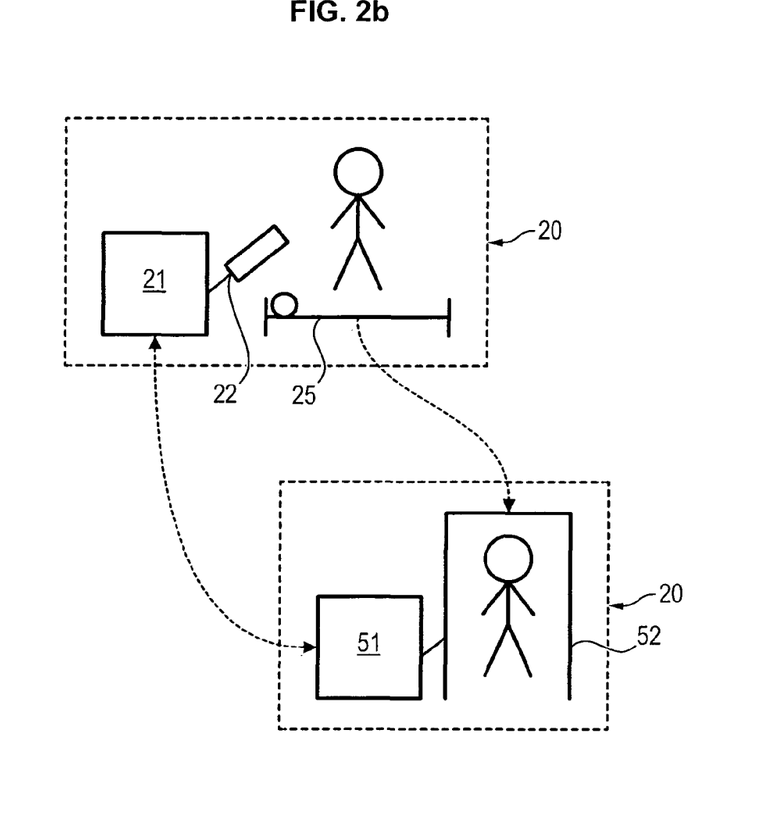

In reference to FIG. 2b, each inspection unit 50 comprises one or more sensors 51 configured to be able to detect determined elements, and control electronics 52 of the sensor(s). When a tracking module 20 is associated with an inspection unit, it is evident that the processing unit 21 of the tracking module is adapted to dialogue with the control electronics 52 of the inspection unit, and advantageously the processing unit can send instructions to the control electronics 52 to drive inspection.

In the case of inspection of persons and their baggage with boarding in an airport, the inspection units can for example be the following types:
  metal walk through detector,
  manual X-ray scanner system for baggage such as for example the models HRX by Morpho,
  detection system for traces of explosives, such as for example the models EntryScan® and Itemiser® by Morpho,
  body scanner etc.

Connecting a tracking module 20 to an inspection unit first identifies the person to be inspected by his public identifier, therefore in full confidentiality, prior to authorising or disallowing inspection of the person, and also adapting the level of inspection and recording the results of the inspection in the database.

Indeed, when a person arrives at a tracking module 20 associated with an inspection unit 50, prior to proceeding with inspection the person is identified by his public identifier. This identification controls, as the case may be, opening of gate 25 placed between the sensor 22 and the inspection unit 50, to authorise inspection of the person by the unit 50.

Also, in the case where the public identifier is associated in the database to security information comprising for example a level of risk linked to the person, the processing unit 21 recognises this level of risk and commands the control electronics 52 of the inspection unit to perform an inspection at a level of sensitivity determined as a function of the level of risk.

For example, if the person presents a high level of risk, the level of sensitivity commanded by the processing unit is high. On the contrary, if the person presents a low level of risk, an inspection step can be superfluous and the processing unit 21 can command the inspection unit to adopt a low level of sensitivity, or even not perform an inspection operation.

More generally, a risk profile can be associated with the public identifier of a person, this profile comprising a level of risk such as obtained by the control module during checking of the access rights of the person, but also the results of inspection operations already undergone by the person.

The processing unit 11 of the control module is adapted to generate the profile from the level of risk received on the person and to record the profile in the database 30.

The processing units of the tracking modules 20 are adapted to read in the database the elements of this profile, and also write in the database 30 the results of the inspection operation performed by the associated unit to update the profile and complete the security information on the person.

As a function of the profile associated with a person, an inspection protocol is prescribed. The protocol comprises especially a list of inspections to be performed on the person and the level of sensitivity of each inspection.

Carrying out this protocol is controlled by the processing units 21 of the tracking modules throughout the progression of the person.

The protocol can also be updated as the person passes through the inspection units. So for example, if a metal walk through detector has detected a quantity of metal on a person considered not to be a risk, this detection is recorded in the database and the inspection protocol can ensure that the person undergoes a body search not programmed initially.

Figure 2C:
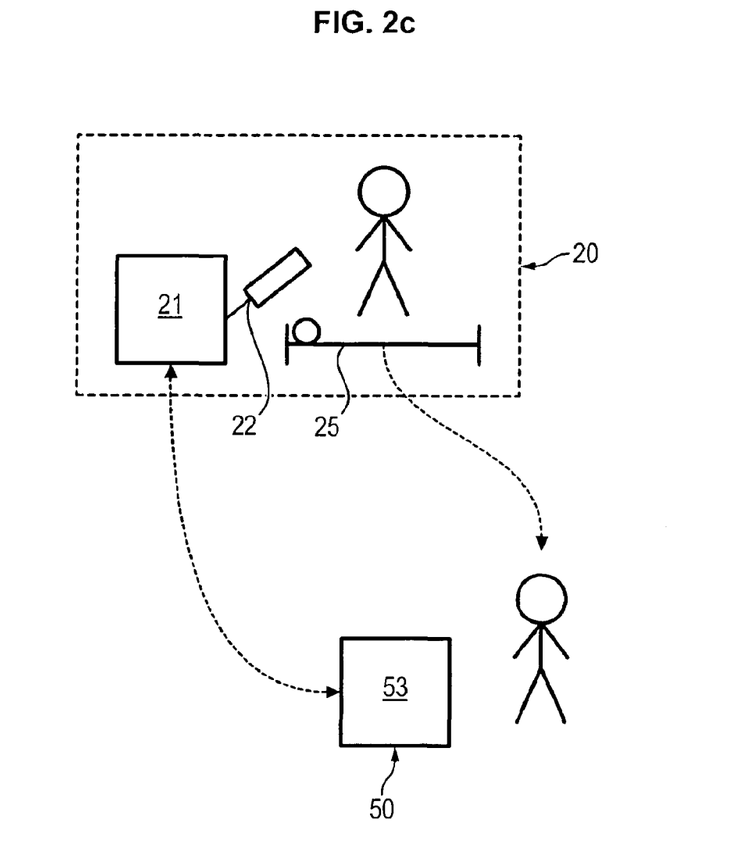
FIG. 2c illustrates a variant inspection unit.

In the case of manual inspection such as a body search, the inspection unit 50, as shown in FIG. 2c, comprises neither sensor nor control electronics but simply a computer station 53 fitted with a man-machine interface via which an operator can input the results of an inspection. The computer station 53 is in communication with the processing unit 21 to inform the operator of the level of risk associated with the person to be inspected.

As shown in FIG. 2a, an inspection unit 50 can also be associated with the control module 10. The person is in fact identified when passing through the control module 10, and in the same way the processing unit 11 of this module can control the inspection unit as a function of the level of risk attributed to the public identifier of the person, and record the results of the inspection in the database.

Finally a tracking module 20 can be not associated with an inspection unit 50. This is for example the case of a tracking module 20 to be crossed to exit from the inspection zone and validate all the inspection operations carried out. When this tracking module is being passed through, the corresponding processing unit 21 verifies that all the steps of the inspection protocol adapted to the person have been conducted before authorising the person to pass through the module and sending to the database the deletion instruction of the encrypted biometric signature associated with this identifier.

Figure 4:
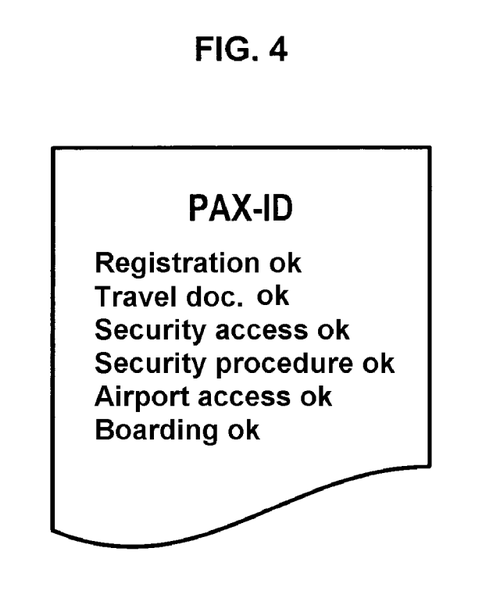
FIG. 4 illustrates an example of verification of a person passing through control points.

The summary of the security information relevant to said person and/or the control and/or inspection processing (performed at the level of a control and/or inspection point) can also be displayed for the attention of the person or an operator, as shown by way of example in FIG. 4.

This summary can advantageously comprise a list of security information such as the level of risk associated with the person, the fact of knowing if he/she has duly passed through all the control steps, verification of access rights, the result of inspection steps etc.

When one of the steps has not been executed or when the report on the inspection operation indicates that the person is carrying items of risk (traces of explosives, metal, etc.), an alarm can be triggered by the processing unit, or the latter can prohibit the person from leaving the inspection zone and direct him to a secure area.

According to a particular embodiment, the inspection system can therefore comprise a control module 10 associated with a single inspection unit 50, and a single tracking module 20 at the exit of the inspection zone.

According to another particular, but not limiting, embodiment shown in FIG. 2a, a control module 10 is associated with an inspection unit 50 by detection of traces of explosives.

Then, a first tracking module 20' is associated with a metal walk through detector 50' and a line of handheld X-ray baggage scanners, and another module 20" in parallel is connected to the walk through detector and to a second line of handheld X-ray baggage scanners 50".

At the exit of these two lines, a tracking module 20''' is associated with a body scanner inspection unit 50'''.

Finally, a tracking module 20' is associated with a baggage search and body search station comprising a station 53.

Once the person has completed the inspection protocol applying to him, a tracking module 20" comprising a gate 25 to an exit zone terminates the protocol. This module is not connected to an inspection unit.

It is noted that it suffices for a person to have undergone the full inspection protocol, irrespective of the order of inspections, to pass through the inspection zone. This eliminates the sequential character and therefore the wait lines of conventional inspections.

Also, and in particular in the event where there are several inspection units, the processing units 21 of the tracking modules can receive information relative to the flows persons in the inspection zone (this information can originate from the processing units themselves or from outside the system 1) and adapt as a function of this information the order of execution of the inspection protocol.

For example, in the case of FIG. 2a, at the end of an inspection unit 50 for detection of traces of explosives, two lines of handheld X-ray baggage scanners are installed for distributing the flow of persons as a function of the load on each line.

If the inspection unit 50 associated with the walk through detector of traces of explosives determines that there is no wait line at the first X-ray scanner 50', it can urge the person to move to the scanner after passing through the walk through detector of traces of explosives. In this respect, the processing units of the tracking and control modules are advantageously provided with man-machine interfaces for displaying this information.

Control Process

Figure 3:
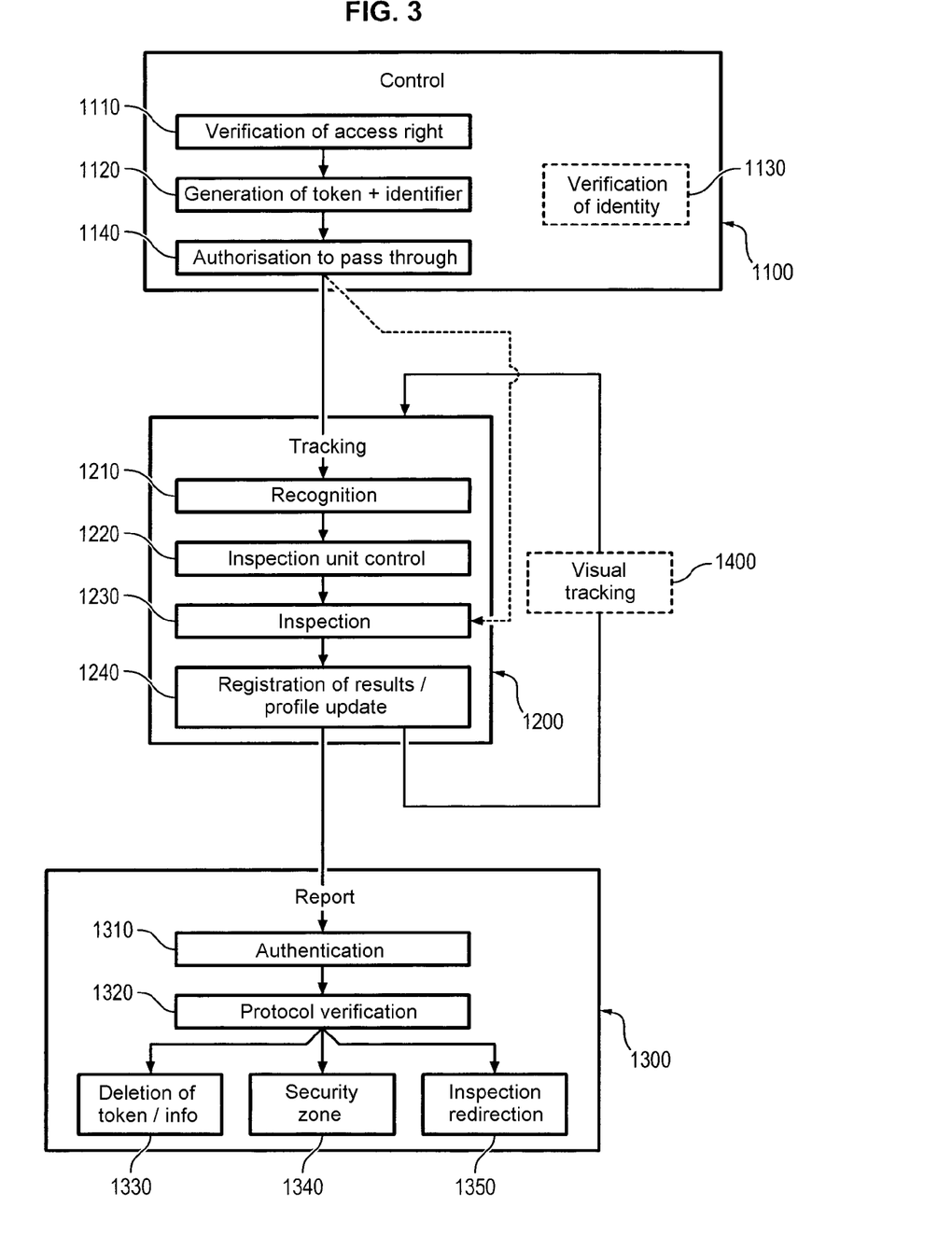
FIG. 3 illustrates the principal steps of a control process of a person.

In reference to FIG. 3, the main steps of a control process executed by a system described hereinabove will now be summarised.

During a first step 1100, a person presents at a first control and/or inspection point, embodied by a control module 10.

The latter verifies 1110 his right of access to the zone, for example by reading of a boarding pass and generates 1120, from a biometric and/or identification datum acquired on the person, an identity token J and an associated public identifier ID stored in the database 30 in association with the token or the biometric and/or identification data having allowed its preparation.

The control module optionally verifies 1130 the identity of the person and obtains from an external database a set of information for attributing to the person security information such as a level of risk, causing prescription of a precise inspection protocol of the person. Other security information can be attributed to the person, such as validation of the identity or validation of the access control.

Then the processing unit 11 of the control module 10 authorises 1140 the person to pass through the module 10.

If this first module is a control and inspection point of the person, an inspection unit is connected to the control module 50. In this case, during step 1140 the processing unit 11 authorises the person to present itself at the inspection unit. Next, inspection steps 1230 and 1240 described hereinbelow are carried out.

However, if this first module is just a control point, the person then arrives at a second control and/or inspection point, embodied by a tracking module 20.

During a second step 1200, the person presents itself at a second control and/or inspection point, this point being embodied by a first tracking module 20. The tracking module 20 acquires biometric and/or identification data on the person corresponding to data used to generate the identity token.

According to the particular embodiment in which the identity token comprises an encrypted biometric signature, a biometric datum is acquired from the same biometric trait as that from which the encrypted biometric signature has been generated.

Then this biometric datum, once encrypted by the same protocol as that executed by the control module 10, is compared to the signatures stored in the base so that the tracking module 20 identifies the person by his/her public identifier.

More generally, the processing unit 21 conducts authentication of the person from the data acquired and the data or tokens stored in the base.

From this recognition, the processing unit 21 of the tracking module accesses the profile of the person in the database, and in particular the security information comprising the level of risk associated with the person, and if needed the results of the inspection made at the first point of inspection.

Based on this security information, the processing unit deduces inspection instructions to be carried out on the person for performing the prescribed inspection protocol.

The processing unit 21 commands 1220 the inspection unit 50 a level of sensitivity to adopt at the inspection of the person.

At the stage of recognition of the person by his public identifier, the processing unit 21 can also receive information on the numbers of persons now waiting at the following control and/or inspection points, and as a function of these data it can indicate to the person a control and/or inspection point to move to next. This step can of course also be performed by the control module.

The processing unit authorises the person to proceed with inspection, and this is then carried out during a step 1230. Alternatively, as indicated hereinabove, the inspection is carried out after the control of the person by the control module, if the inspection unit is connected to the inspection module.

In terms of inspection, the processing unit 21 (or 11 if needed) receives from the inspection unit 50 a result of the inspection undertaken and records 1240 these results in the database to update the profile of the person.

The person passes through the different control and/or inspection points, each inspection unit associated with a tracking module 20 adapting the level of sensitivity as a function of the preceding steps.

Advantageously, but optionally, between two control and/or inspection points of a person or his baggage, tracking 1400 without identification of the person can be undertaken. For this, cameras can be installed in the inspection zone, a first camera detecting the person when he crosses a control point, and associating with that person the public identifier of the person who has just been identified at this point.

Then, when the person moves on, other images of this person can be acquired by the same or other camera, this person being recognised for example by his/her face, his/her outfit or his/her gait.

Finally, the person accesses the tracking module 20 when leaving the inspection zone for an evaluation 1300 of the inspection protocol, and reiterates the identification operation by public identifier 1310.

The processing unit 21 consults the database 30 to verify 1320 that the person has passed through all the steps of the inspection protocol and that no risk has been identified. In this case, the processing unit 21 of the module authorises the person to exit from the inspection zone and deletes 1330 the biometric and/or identification data or the identity token corresponding to his public identifier of the database and retains the other information of the profile.

If a risk has been identified in the person during the inspection, his exit from the inspection zone is prohibited and the person is directed to a security area 1340.

If the person has not performed one of the steps of the inspection protocol, the processing unit 21 informs 1350 of this.

An inspection system of a person for tracking the person throughout the inspection protocol without having to geographically locate him in the inspection zone has been proposed. It suffices in fact to access the profile associated with the public identifier of the person to know which inspection steps he/she has already passed through and which steps are yet to be crossed.

Also, if the sensors 12, 22 are capable of acquiring biometric data on the fly, the inspection protocol is executed without slowing the progression of the person, and even without the latter realising that a specific inspection protocol is being conducted for him/her.

This inspection protocol is also conducted in complete confidentiality since it is performed tracking a public identifier generated randomly. For security services, it is however possible to access the identity token associated with the identifier and the inspection results associated with the identifier and this token.

The control process as presented is also compatible with managing classic flow of persons, since as indicated hereinabove the flow of persons can be managed in real time as a function of the influx at the different inspection units.

The invention claimed is:

1. A process for control of persons, wherein different control and/or inspection steps are conducted at different control and/or inspection points intended to be crossed by a person, the process being executed by a system comprising said control and/or inspection points, placed in an inspection zone to be crossed to access a zone of secure access, wherein the process comprises execution of the following operations:
   when a person passes a first control and/or inspect point: acquisition of biometric data of a person,
   generation of a security identity token, the token being an encrypted biometric signature obtained from a biometric datum acquired on the person,
   generation of a public identifier associated with said token and storage of said identifier in a database storing the public identifiers in association with the identity tokens or the data from which they are generated,
   when a person passes at least one other control and/or inspect point,
   acquisition of a biometric datum on said or the same biometric traits as those on which the biometric datum has been acquired during passage to the first control point, and from which the identity token has been generated,
   obtaining, from said biometric datum, an encrypted biometric datum by performing the same encrypting protocol than the one performed to obtain the secure token,
   determination of the public identifier of the person by performing authentication of said person by comparison of the encrypted biometric datum to the secure identity token, the comparison being performed by means of a secure calculation protocol,
   association with the public identifier of a person of security information relevant to said person and/or to the control and/or inspection processing executed at the level of said point, and
   saving of this information with said public identifier in the database.

2. The process according to claim 1, wherein the biometric data are acquired on the fly from contactless biometric sensors.

3. The process according to claim 1, further comprising when the latter passes at least one control and/or inspection point:
- determination of security information connected to the public identifier of a person,
- adaptation of the control and/or inspection processing to said control point as a function of this information.

4. The process according to claim 3, wherein the security information connected to the public identifier of a person comprises a risk profile of the person, and an inspection protocol determined as a function of the risk profile is performed on the person at each control and/or inspection point.

5. The process according to claim 4, wherein the inspection protocol comprises instructions on crossing determined control and/or inspection points and levels of inspection sensitivity to be carried out at one or more control and/or inspection points.

6. The process according to claim 3, further comprising when a person passes a control and/or inspection point, once said person has crossed one or more determined control and/or inspection points, deletion of the identity token or biometric or identification information of the person in the database.

7. The process according to claim 6, wherein, after the deletion of the identity token or biometric or identification information of a person in the database, the associated public identifier and security information relevant to the person and/or to the control and/or inspection processing performed on said person are stored in the base.

8. The process according to claim 1 further comprising, when a person passes at least one control and/or inspection point:
- acquisition of information relative to numbers of persons arriving at control and/or inspection points; and
- directing of persons to a following control and/or inspection point as a function of said information.

9. The process according to claim 1, comprising, when a person passes a control and/or inspection point, verification of crossing rights of the person through said control and/or inspection point.

10. The process according to claim 1, wherein at least one control and/or inspection point is applied to baggage associated with a person, the process comprising, when passing said control and/or inspection point applied to baggage, association with the public identifier of the person of information relevant to control and/or inspection processing performed on the baggage.

11. The process according to claim 1, comprising, when a person crosses a control and/or inspection point, the acquisition of images of said person, and, when the person is moving between two control and/or inspection points, tracking of said person by acquisition of images of said person.

12. Application of the process according to claim 1 for the control and the inspection of passengers and aircrew in an airport.

13. A control and inspection system of persons in an inspection zone, the system comprising a plurality of control and/or inspection points, the system further comprising at least one processor configured to execute the process according to claim 1.

14. The control and inspection system of persons according to the claim 13, comprising at each control and/or inspection point a module comprising a processing unit and a biometric sensor, and further comprising at least one inspection unit associated to said module, the inspection unit being adapted to communicate with the processing unit to adapt inspection processing of a person as a function of information supplied by the processing unit.

* * * * *